(No Model.) 3 Sheets—Sheet 2.

N. SEIBERT.
CONDUIT FOR ELECTRIC RAILWAYS.

No. 441,258. Patented Nov. 25, 1890.

WITNESSES.
Matthew M. Blunt
William H. Parry

INVENTOR.
Nicholas Seibert (No Model.) 3 Sheets—Sheet 3.

N. SEIBERT.
CONDUIT FOR ELECTRIC RAILWAYS.

No. 441,258. Patented Nov. 25, 1890.

WITNESSES.
Matthew M. Blunt
William H. Parry

INVENTOR.
Nicholas Seibert

UNITED STATES PATENT OFFICE.

NICHOLAS SEIBERT, OF MALDEN, MASSACHUSETTS.

CONDUIT FOR ELECTRIC RAILWAYS.

SPECIFICATION forming part of Letters Patent No. 441,258, dated November 25, 1890.

Application filed March 5, 1890. Serial No. 342,795. (No model.)

*To all whom it may concern:*

Be it known that I, NICHOLAS SEIBERT, a citizen of the United States, residing at Malden, in the county of Middlesex and State of Massachusetts, have invented certain new and useful Improvements in Conduits for Electric Railways, of which the following is a full, clear, and exact description, reference being had to the accompanying drawings, forming part of this specification, in which—

Figure 1:
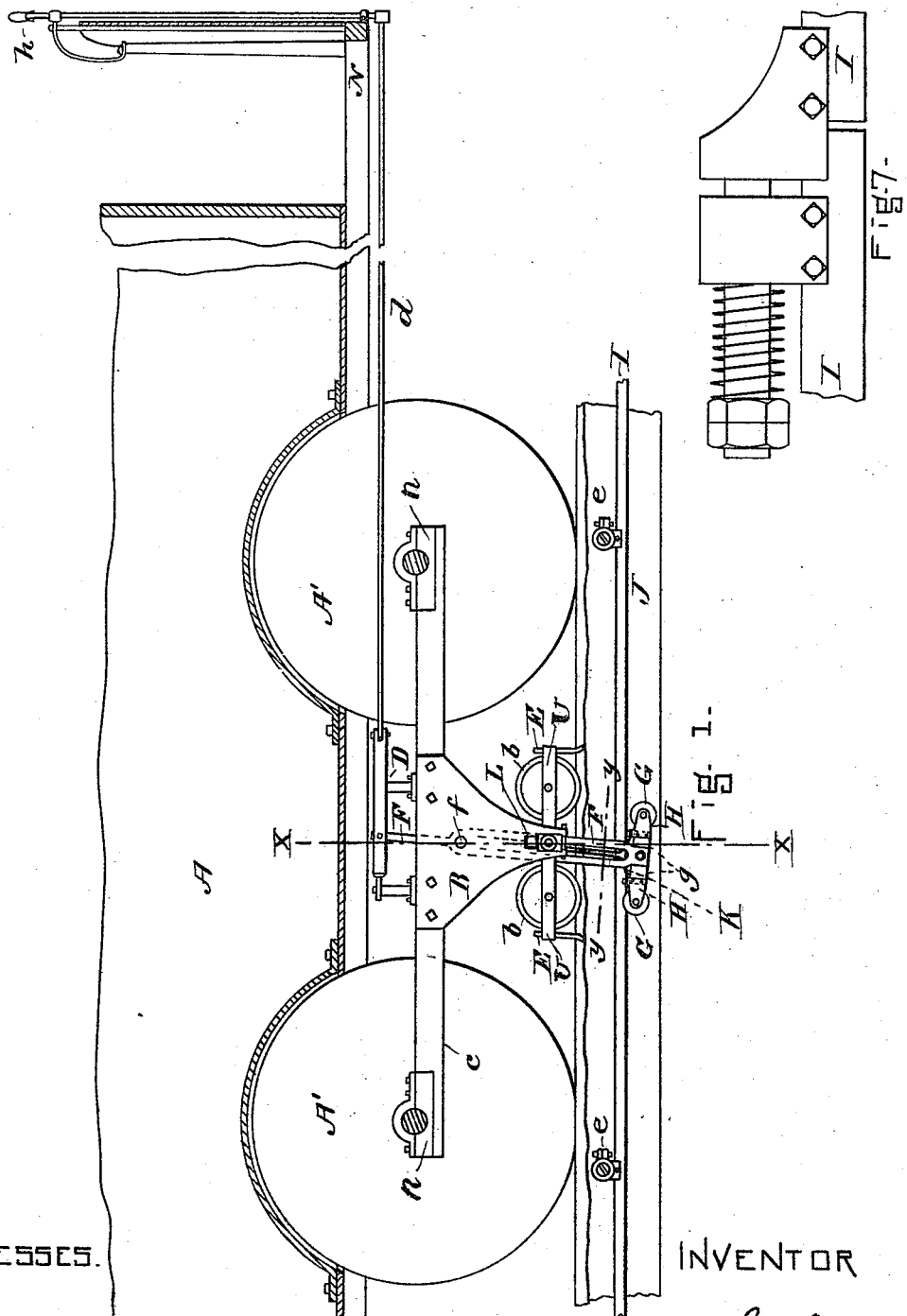
Figures 2, 3, 4, 5:
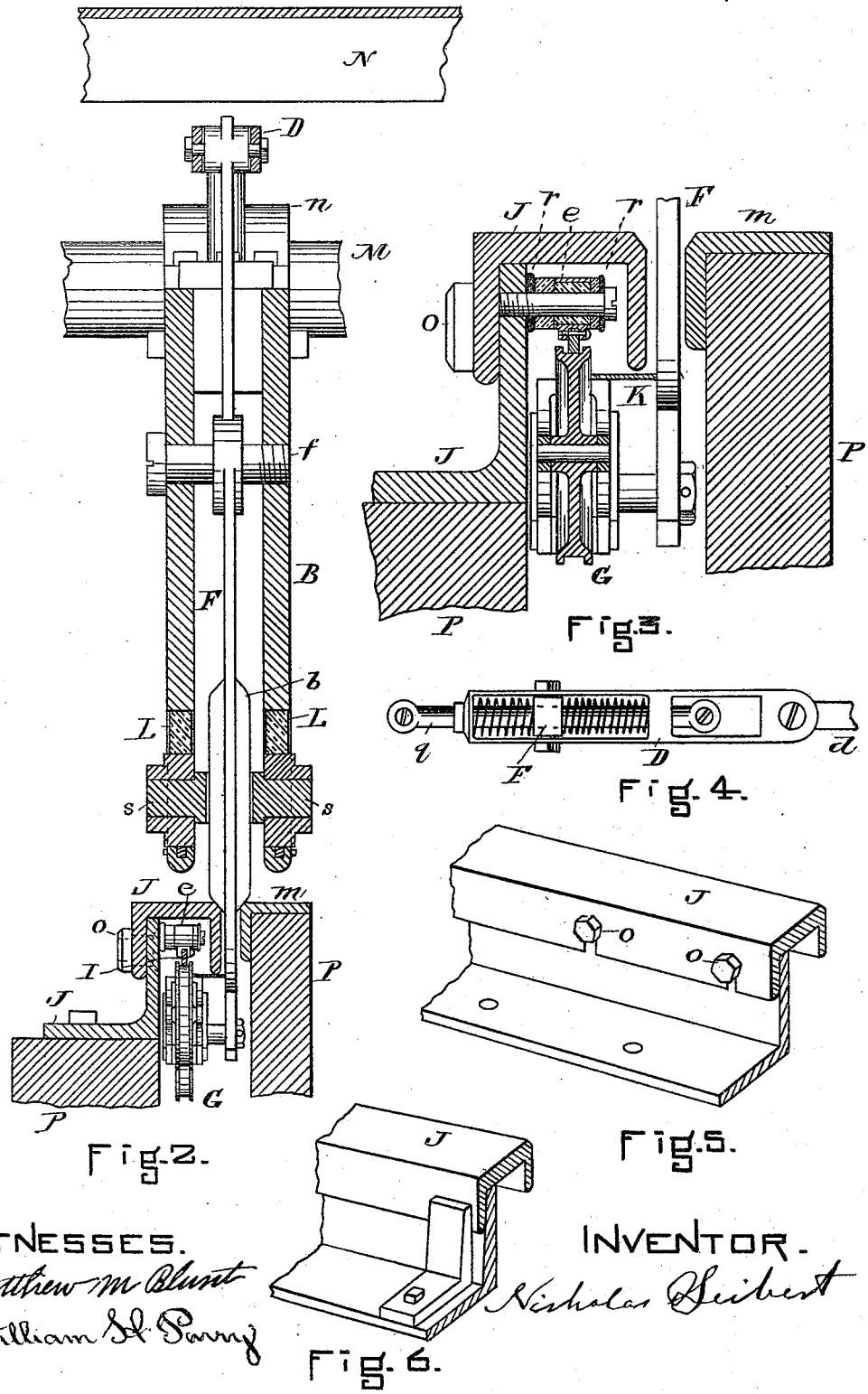
Figure 6:
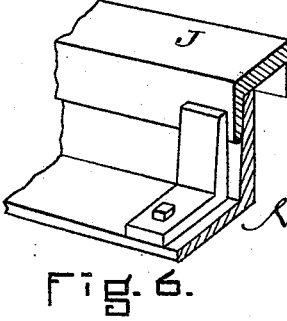
Figure 9:
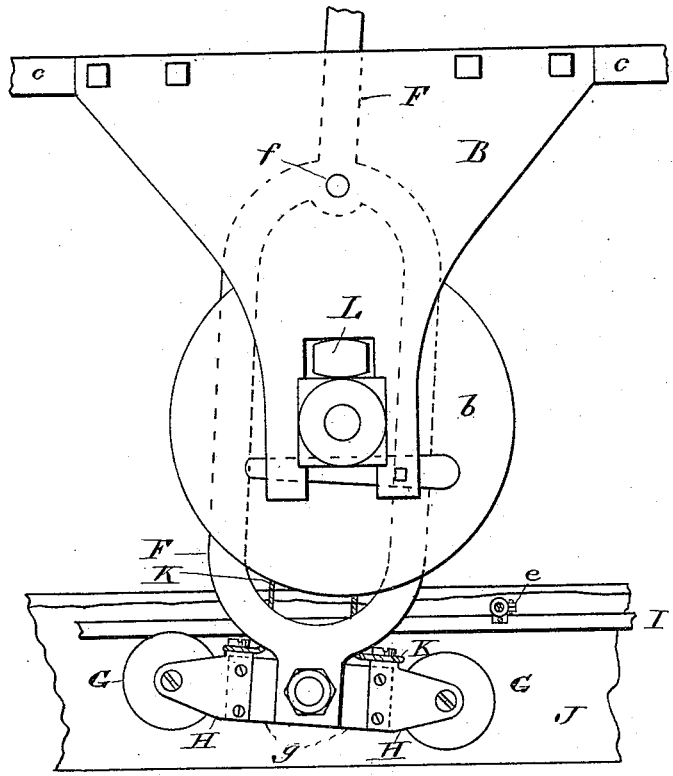
Figure 8:
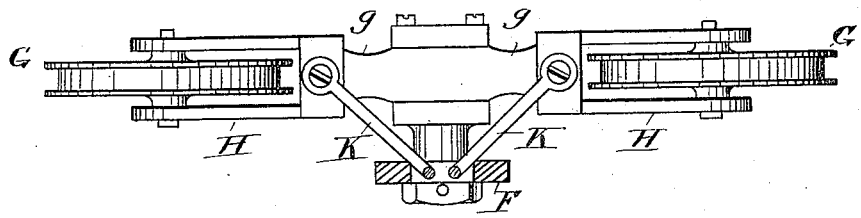

Figure 1 is a section of a car with my improved truck supporting the arm F with pulleys; Fig. 2 an enlarged section on line *x x* of Fig. 1; Fig. 3, an enlarged sectional view of housing; Fig. 4, a plan of spring for controlling the arm F; Fig. 5, a perspective view of improved housing; Fig. 6, a modification of same; Fig. 7, a side elevation of expansion-joint; Fig. 8, an enlarged horizontal section on line Y Y, Fig. 1. Fig. 9 shows a modification of my improved truck for supporting the arm F with pulleys.

A is the car. A' A' are the wheels; B, truck-frame; *b*, truck-wheels; *c*, timber secured to the car-axles; D, spring and frame; *d*, rod to reverse the pulleys; E, clearing-irons; *e*, brackets to which the conducting-rail is secured; F, arm carrying the pulleys; *f*, pin upon which the arm F moves; G, pulleys; *g*, rubber or other non-conducting material; H, pulley-support; *h*, crank to reverse the pulleys on the conducting-rail when the car is run in the opposite direction; I, conducting-rail; J, housing; K, conducting-wire leading to the motor; L, rubber cushion; M, car-axle; N, cross-timber at the end of the car; *n*, journal-box to support timber *c*; O, stationary bolt, which secures improved adjustable housing; P, wood; U, truck-beam; *q*, stationary rod for the spring-frame to slide upon; *r*, vulcanized-fiber washer; *m*, angle-iron to form one side of track for the truck; S, trunnion of truck-frame.

The object of my invention is, first, to secure the arm F in such a way that there shall be the least possible lateral motion to said arm, and, second, to construct the housing in such a manner as to facilitate repairs. I use a rail with expansion-joint (in place of a round wire) for conveying an electric current.

To enable others skilled in the art to make and use my invention, I will now describe its construction and indicate the manner in which the same is carried out.

I make the housing J in two parts. The lower section has bolts riveted in it at a proper distance apart and a sufficient clearance left under the heads to allow the top section in which I make slots, as shown at Figs. 3 and 5, to slip behind said bolt-heads. This makes it permanent, but can be easily removed with a bar when repairs are necessary. The truck which carries the arm F and pulleys I make of two wheels of small diameter with parallel beams having journals at the centers and a frame B, as shown at Figs. 1 and 2. The said frame is attached to a timber *c*, whose ends are secured to the axles of the car A by bearings. The truck runs in a slot about half-inch wide and beveled on the edges, as shown at Fig. 2, and at each end of the truck-beams there is a clearing-iron E. The journals S supporting the frame B of the truck I make long to allow play for the side movement of the wheels of the car A, while the two-wheeled truck cannot get out of the slot in the roadway. The arm F is supported and moves upon a pin *f*, and from here extends down into the housing J in two halves and unites at the pulleys for the purpose of protecting the conducting-wire K, which is brought up between the two halves of the arm F and thence to the motor.

In place of a round conducting-wire I prefer to use a flat rail, about three-sixteenths of an inch thick and half-inch wide, which can be secured to the brackets E more permanently. This form of rail I is shown at Fig. 7. The brackets E are made of porcelain, and a hole is made through the center for a bolt to secure the bracket to the lower section of the iron housing. To secure the rail on the bracket, I make a thin brass clamp with a slotted jaw to receive the rail and secured by a screw through the jaw. (Shown at Fig. 3.) The two ends of the clamp are brought together around the bracket and secured by a screw. (Shown at *e*.) The spring in frame D will at all times press the pulley G in close contact with the rail I.

The rubber *g*, upon which the brass pulley-support is secured, will correct any lateral irregularity of the rail I under the housing.

The operation of my invention is as follows:

The electric current being on the rail I, the rod $d$ is moved in the direction in which the car is intended to run. This will bring the pulley G in close contact with the rail I, the current from the rail will pass to the pulley G, thence to the pulley-support H, and thence to the conducting-wire K and up from under the housing J and between the two halves of arm F and inside of truck-frame B, and thence to the motor.

Having thus described my invention, what I claim as new, and desire to secure by Letters Patent, is—

1. The combination, with a railway-truck, of a supplemental frame suspended therefrom and having supplemental wheels $b$, a housing containing an electric conductor, a rocking support having contacts adapted to be brought into engagement with the conductor, and connections from the rocking support to the car-motor, substantially as herein described.

2. The combination, with a slotted housing containing an electric conductor and a vehicle adapted to be propelled by a current supplied thereto, of a supplemental wheeled frame suspended from the main truck-frame of the vehicle, a rocking arm mounted in the frame and provided with a plurality of contacts adapted to be brought into engagement with the conductor, connections from said arm to the car-motor, and a means for rocking the arm to reverse the contacts, substantially as herein described.

3. The combination, with a car and a slotted housing having an electric conductor supported therein, of a frame suspended from the main truck-frame, and a rocking arm having its lower end entering the slotted housing and provided with a plurality of contacts which are alternately brought into contact with the conductor when the arm is rocked, and wires or conductors from the contacts to the car-motor, substantially as described.

4. The combination, with a car and a slotted housing having an electric conductor fixed therein, of a frame suspended from the main truck of the car and having the supplemental wheels $b$, a rocking arm carried by the supplemental wheeled frame, having its lower end projecting into the slotted housing, contact-pulleys carried at the lower end of said arm and adapted to be alternately thrown into an out of engagement with the conductor, and means for rocking the arm to shift the positions of the pulleys to direct the current to the car-motor, substantially as herein described.

5. The combination, with a slotted housing and a car mounted thereon and adapted to be electrically propelled, of a frame U, suspended from the main truck-frame and having clearing-irons adapted to enter the slot of the housing, supplemental wheels mounted in the frame U, and a rocking bar, also mounted in said frame and having its lower end projecting into the housing through the slot thereof and provided with contact-pulleys, and a conducting strip or rail fixed within the housing and with which the contact-pulleys are thrown into engagement, substantially as specified.

6. The combination, with a car and a slotted housing having a conducting-rail secured therein, of a supplemental wheeled frame carried by the main truck-frame and having a rocking arm let into the housing and provided with contacts adapted to engage the conductor, a sliding frame D, connected with a lever on the car, and a spring-actuated rod in said frame connected with the upper end of the rocking arm to hold the contacts against the conductor, substantially as herein described.

7. In electric railways, the slotted housing adapted to contain the main conductor, said housing consisting, essentially, of two parts or sections, the lower section having the fixed bolts O and the upper section being fitted over the lower section with its vertical flange back of the bolt-heads of the lower section, substantially as herein described.

8. The combination, with a car adapted to be electrically propelled, of a supplemental wheeled frame suspended from the main truck-frame of the car, a rocking arm in said supplemental frame, a slotted housing into which said arm extends, the contact-pulleys in a support on the lower end of the arm, a conductor fixed within the housing, the non-conducting pieces $g$ in said support, and the wires or conductors leading from the support to the car-motor, substantially as herein described.

9. In electric railways, a housing consisting of separable sections removably fitted together, one of said sections having fixed projections and the other a flange adapted to be passed behind the said projections to secure the two sections together, in combination with an angle-iron piece separated from the upper removable section to form a slot adapted to receive an arm from the car and a conductor fixed within the housing but insulated therefrom, substantially as herein described.

10. The combination, with a car, a supplemental frame suspended from the main truck-frame thereof, a rocking arm mounted in said supplemental frame, a flexible non-conducting block at the lower end of the arm, and contact-pulleys mounted in a support from the flexible block and adapted to be alternately thrown into contact with the main conductor to reverse the course of the current to the car-motor, and wires or conductors from said pulley-supports to said motor, substantially as herein described.

11. The combination, with an electrically-propelled car and a slotted housing having a conducting-rail fixed therein, of a supplemental frame suspended from the main truck-frame and provided with wheels $b$, a rocking arm mounted vertically in said supplemental frame and slotted for a considerable portion of its length, a yielding contact-support at the base of the arm, a lever, and connections on the car for rocking the arm to change the contacts, and a spring acting against the upper end of the arm to hold the contacts against the conductor, substantially as herein described.

12. The combination, with the car, its supplemental wheeled frame, and the slotted housing for the main conductor, of a rocking arm having contact-pulleys on its lower end within the housing, means for rocking the arm to change the contacts, and the extended trunnions $s$, adapted to provide for the lateral movement of the car, substantially as described.

NICHOLAS SEIBERT.

Witnesses:
W. N. SEIBERT,
J. W. RANDALL.